(12) United States Patent
Johnson

(10) Patent No.: US 6,877,593 B2
(45) Date of Patent: *Apr. 12, 2005

(54) AUTOMATIC TRANSMISSION FRICTION CLUTCH

(76) Inventor: Kenneth O. Johnson, 8360 Arapaho La., Cincinnati, OH (US) 45243

( * ) Notice: Subject to any disclaimer, the term of this patent is extended or adjusted under 35 U.S.C. 154(b) by 4 days.

This patent is subject to a terminal disclaimer.

(21) Appl. No.: 10/381,409
(22) PCT Filed: Oct. 2, 2001
(86) PCT No.: PCT/US01/42456
§ 371 (c)(1),
(2), (4) Date: Mar. 24, 2003
(87) PCT Pub. No.: WO02/29285
PCT Pub. Date: Apr. 11, 2002

(65) Prior Publication Data
US 2003/0183470 A1 Oct. 2, 2003

Related U.S. Application Data
(60) Provisional application No. 60/237,615, filed on Oct. 3, 2000.

(51) Int. Cl.[7] ............................................. F16H 45/02
(52) U.S. Cl. ........................................ 192/3.31; 60/363
(58) Field of Search ............................... 192/3.21, 3.28, 192/3.31; 60/363

(56) References Cited

U.S. PATENT DOCUMENTS

| | | |
|---|---|---|
| 1,129,720 A | 2/1915 | Patterson |
| 1,307,864 A | 6/1919 | Jones |
| 1,965,518 A | 7/1934 | Wilson |
| 2,002,629 A | 5/1935 | Cobb et al. |
| 2,168,862 A | 8/1939 | De Lavaud |
| 2,333,674 A | 11/1943 | Powell |
| 2,357,654 A | 9/1944 | Horton |
| 2,380,734 A | 7/1945 | Eastin |
| 2,389,174 A | 11/1945 | Whitworth |
| 2,469,085 A | 5/1949 | Sheppard |
| 2,909,034 A | 10/1959 | Jandasek |
| 3,271,958 A | 9/1966 | Meyerhoff |
| 3,306,041 A | 2/1967 | Verzolla |
| 3,327,478 A | 6/1967 | Alexandrescu |
| 3,431,728 A | 3/1969 | Bezimensky |
| 4,037,692 A | 7/1977 | McFarland |
| 4,113,075 A | 9/1978 | Walker |
| 4,186,555 A | 2/1980 | Fauconnet |
| 4,406,121 A | 9/1983 | Pelto |
| 4,672,810 A | 6/1987 | Marlowe |
| 5,065,509 A | 11/1991 | Sahashi |
| 5,331,811 A | 7/1994 | Giberson |
| 5,348,127 A | 9/1994 | Murata et al. |
| 5,394,694 A | 3/1995 | Doumov et al. |
| 5,409,428 A | 4/1995 | Antonov |
| 5,794,436 A | 8/1998 | Maeda |
| 6,711,896 B1 * | 3/2004 | Johnson ........................ 60/363 |

FOREIGN PATENT DOCUMENTS

| | | |
|---|---|---|
| DE | 814100 | 9/1951 |
| GB | 328093 | 4/1930 |
| GB | 711546 | 7/1954 |
| SU | 34434 | 3/1929 |
| SU | 798380 | 1/1981 |
| SU | 842315 | 6/1981 |

OTHER PUBLICATIONS

"The Way Things Work," Simon and Schuster, © 1967, title page, copyright page, foreword; pp. 486–499.

* cited by examiner

Primary Examiner—Richard M. Lorence
(74) Attorney, Agent, or Firm—Baker & Daniels (57) ABSTRACT

A transmission apparatus (416) is provided that is configured to transmit energy from a power source to a work device. Transmission apparatus (416) includes an input shaft (426) adapted to receive energy from the power source and an output shaft (434) adapted to transfer energy to the work device. Preferably, transmission apparatus (416) further includes a fluid coupling (25) configured to transfer energy from input shaft (426) to output shaft (434) and a mechanical coupling (24) configured to transfer energy from input shaft (426) to the output shaft (434).

30 Claims, 7 Drawing Sheets

AUTOMATIC TRANSMISSION FRICTION CLUTCH

This application is the national phase under 35 U.S.C. § 371 of PCT International Application No. PCT/US01/42456, which has an International filing date of Oct. 2, 2001, designates the United States of America, and claims the benefit of U.S. Provisional Patent Application Ser. No. 60/237,615, which was filed Oct. 3, 2000.

BACKGROUND OF THE INVENTION

The present invention relates to automatic transmission apparatus. More particularly, the present invention relates to hydraulic automatic transmission apparatus and to clutches.

Fluid couplers, such as torque converters, are used to convert the speed and torque output of a power source into a more usable speed and torque input for a work device. Many power sources convert one type of energy into an output of mechanical energy. For example, an internal combustion engine converts the energy stored in hydrocarbon fuel to rotational energy. Work devices typically use this mechanical energy to perform a useful function. For example, the tires of a vehicle use the rotational energy provided by the engine to propel the remainder of the vehicle. However, the output (speed and torque) provided by the power sources do not always match the input (speed and torque) required by the work device.

Because the output speeds and torques of the power sources often do not match the input speeds and torques required by the work devices, fluid couplers are provided to receive power from the power source at one speed and torque and to transfer this power to work devices at a different speed and torque as required by the work devices. Many fluid couplers have an input shaft and input blades that transfer the speed and torque supplied by the power source to a fluid. The power is then transferred through the fluid to output blades and an output shaft as the input to the work device. Thus, the input and output blades are able to rotate relative to one another at different speeds and torques so that the output from the power supply and the input to the work device can also rotate at different speeds and torques.

Hydraulic transmission apparatus are specific fluid couplers that are provided between power sources and work devices to convert the output of the power source into a more usable input for the work device. For example, a hydraulic vehicle transmission apparatus converts the relatively high rpm and low torque output of an internal combustion engine into a relatively low rpm and high torque input to the tires of a vehicle. This permits the tires to accelerate the vehicle relatively quickly from rest without overloading the available output torque of the engine. Furthermore, this enables coordination of the speed and torque output of the engine with the speed and torque requirements of the tires to facilitate smooth acceleration of the vehicle.

According to the present disclosure, a transmission apparatus configured to transmit energy from a power source to a work device is provided. The transmission apparatus includes an outer housing, input and output shafts, first and second pumps, first and second turbines, and a centrifugal clutch. The outer housing defines an interior region containing a fluid. The input shaft is configured to rotate about a first axis of rotation and is adapted to be coupled to the power source to receive energy therefrom. The output shaft is configured to rotate about a second axis of rotation and is adapted to be coupled to the work device to transmit energy thereto.

The first pump is positioned in the interior region of the outer housing and is coupled to rotate with the input shaft to input a first portion of the energy from the power source into the fluid contained in the interior region of the outer housing. The first turbine is positioned in the interior region of the outer housing between the first and second pumps. The first turbine is positioned to receive energy from the fluid contained in the interior region of the outer housing and to transmit said received energy to the output shaft.

The second pump is positioned in the interior region of the outer housing in a position spaced apart from the first pump between the first and second turbines. The second pump is coupled to rotate with the input shaft to input a second portion of the energy from the power source into the fluid contained in the interior region of the outer housing.

The second turbine is positioned in the interior region of the outer housing in a position spaced apart from the first turbine. The second turbine is positioned to receive energy from the fluid contained in the interior region of the outer housing and to transmit said received energy to the output shaft. The centrifugal clutch is configured to transfer energy from the input shaft to the output shaft.

According to another aspect of the present invention, a transmission apparatus is provided that is configured to transmit energy from a power source to a work device. The transmission apparatus includes input and output shafts, first and second stages of pump blades, a stage of turbine blades, and a coupler. The input shaft is adapted to receive energy from the power source. The output shaft is adapted to transmit energy to the work device. The first stage of pump blades is configured to transfer energy from the input shaft into a fluid. The second stage of pump blades is spaced apart from the first stage of pump blades and is configured to transfer energy from the input shaft into the fluid. The stage of turbine blades is configured to transfer energy from the fluid to the output shaft. The coupler is configured to directly couple the input shaft to the output shaft to transfer energy from the input shaft to the output shaft.

According to another aspect of the present invention, a transmission apparatus is provided that is configured to transfer energy from a power source to a work device. The transmission apparatus includes input and output shafts, fluid coupler, and a mechanical coupler. The input shaft is adapted to receive energy from the power source. The output shaft is adapted to transmit energy to the work device. The fluid coupler is configured to transfer energy from the input shaft to the output shaft. The mechanical coupler is configured to transfer energy from the input shaft to the output shaft simultaneous with the transfer of energy from the input shaft to the output shaft by the fluid coupler. The percentage of power transferred by the fluid coupler gradually decreasing and the percentage of power transferred by the mechanical coupler gradually increasing as the speed of the output shaft increases.

According to another aspect of the present invention, a transmission apparatus is provided that is configured to transmit energy from a power source to a work device. The transmission apparatus includes input and output shafts and a plurality of input and output blades. The input shaft is adapted to receive energy from the power source. The output shaft is adapted to transmit energy to the work device. The input blades are configured to transfer energy from the input shaft to a fluid. The plurality of output blades are configured to transfer energy from the fluid to the output shaft. The transmission apparatus further includes means for regulating the relative speed between the input and output blades to decrease to relative speed therebetween as the speed of the output shaft increases.

Additional features of the disclosure will become apparent to those skilled in the art upon consideration of the following detailed description when taken in conjunction with the accompanying drawings.

BRIEF DESCRIPTION OF THE DRAWINGS

The detailed description particularly refers to the accompanying FIGURES in which.

DETAILED DESCRIPTION OF THE DRAWINGS

Figure 1:
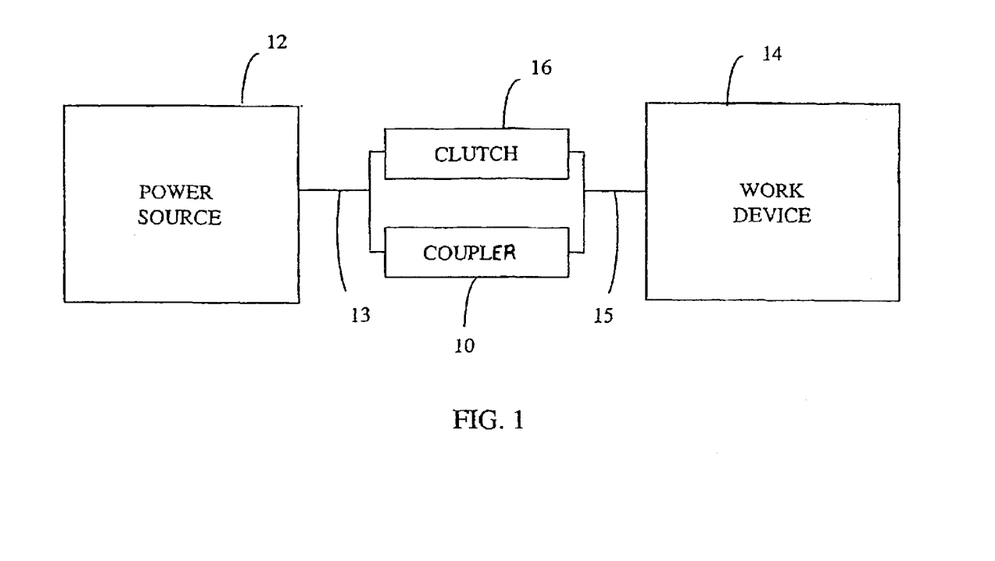
FIG. 1 is a block diagram showing a power source, a work device spaced apart from the power source, a coupler that couples the power source to the work device, and a clutch that simultaneously couples the power source to the work device during ramp up of the work device speed.

As shown in FIG. 1, a coupler 10, such as a torque converter, hydraulic transmission, clutch, or other configuration of coupler, is coupled to an output 13 of a power source 12 for transmitting energy from power source 12 to an input 15 of a work device 14. Power source 12 is any of a number of devices, such as a combustion engine, electric motor, or gas turbine, that converts one type of energy to mechanical energy or otherwise provides power. Work device 14 is any number of apparatus, such as vehicle wheels, factory equipment, generators, or other mechanical devices, that use the energy from power source 12 to perform a function.

Coupler 10 is provided to transmit the mechanical energy generated by power source 12 to work device 14 in a form that is more usable by work device 14. For example, power source 12 may be operating at 100 rpm at ten foot-pounds of torque, while work device 14 is initially stationary (operating a zero rpm) and requires an increased magnitude of torque to start moving.

Preferred coupler 10 transmits this power from power source 12 to work device 14 through a fluid (not shown) to hydraulically couple power source 12 to input 15 of work device 14. This hydraulic coupling permits output 13 of power source 12 to rotate at a different rpm and torque than input 15 to work device 14. Thus, the coupling provided by coupler 10 facilitates the transfer of power from power source 12 at one speed and torque to work device 14 that requires power at another speed and torque. According to alternative embodiments of the present disclosure, a coupler is provided that pneumatically, mechanically, magnetically, or otherwise couples the power source to the work device.

According to the present disclosure, a clutch or other coupler 16 is provided in parallel with coupler 10 to increase the overall power transmission efficiency from power source 12 to work device 14. Clutch 16 mechanically, hydraulically, pneumatically, magnetically, or otherwise couples output 13 of power source 12 to input 15 of work device 14 more efficiently than coupler 10.

Clutch 16 is provided so that when the need for the coupling characteristics provided by coupler 10 is reduced or eliminated, the more efficient coupling provided by clutch 16 replaces or eliminates the less efficient coupling provided by coupler 10. Thus, by shifting the power transfer from the coupling provided by coupler 10 to the coupling provided by clutch 16, the overall power transmission efficiency from power source 12 to work device 14 increases.

Figure 2:
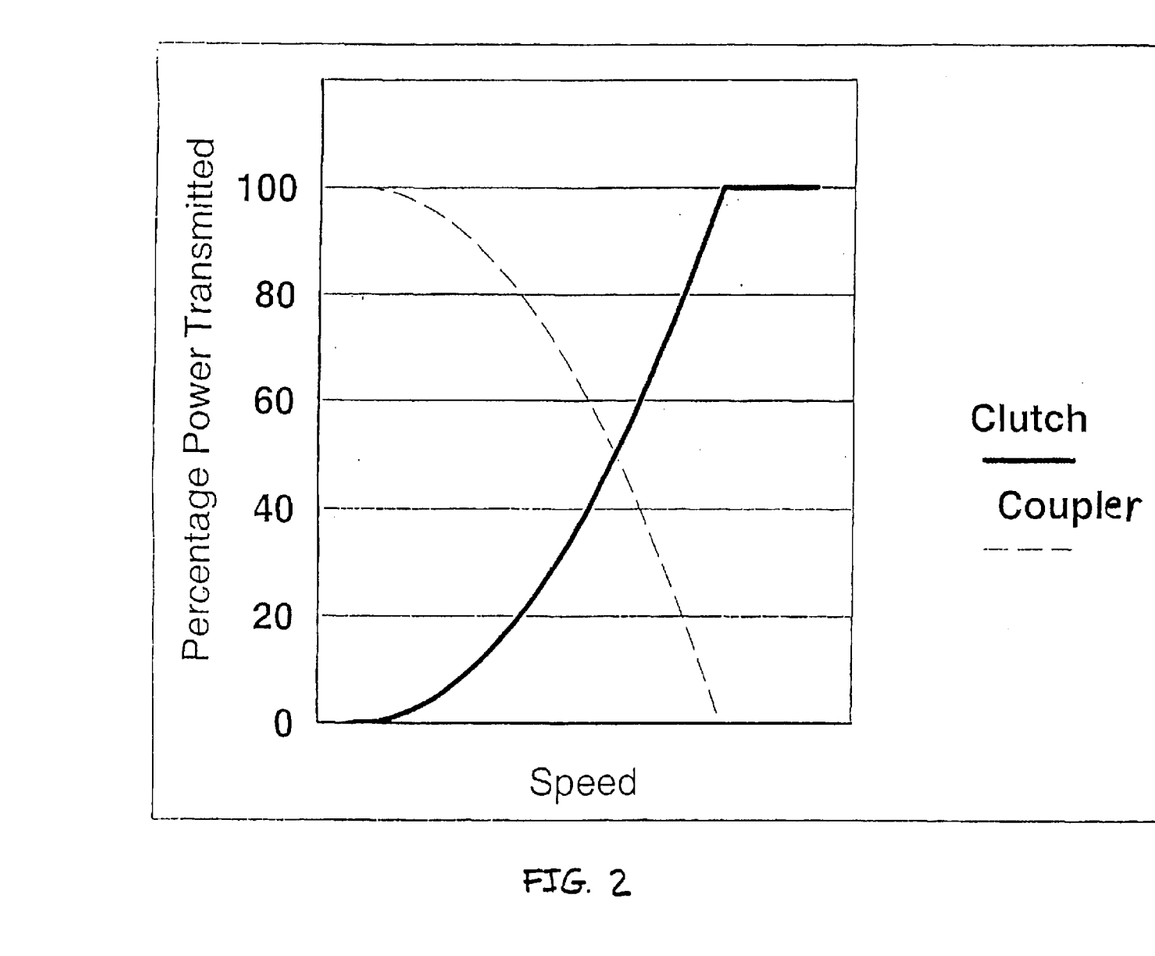
FIG. 2 is a graph depicting the percentage of power transmitted from the power source to the work device by the coupler and clutch versus the speed of the input to the work device showing a shift in the percentage of power transmitted by the coupler and the clutch as the speed of the input to the work device increases.

According to the present disclosure, at initial start-up of the power transfer, coupler 10 transmits all or most of the power to input 15 of work device 14 and clutch 16 transmits little or no power as shown in FIG. 2. As the speed of input 15 of work device 14 increases, the percentage of power transmitted by clutch 16 increases and the percentage of power transmitted by coupler 10 decreases until a predetermined speed is reached, at which point all the power is transmitted by clutch 16. Thus, during a predetermined range of speeds, coupler 10 and clutch 16 simultaneously transmit power from power source 12 to work device 14. According to the presently preferred disclosure, the percentage of power transmitted by clutch 16 increases by the square of the speed of input 15 of work device 14. According to other embodiments of the disclosure, the increase is linear, partially linear, exponential, or any other relationship depending on the specific application.

Figure 3:
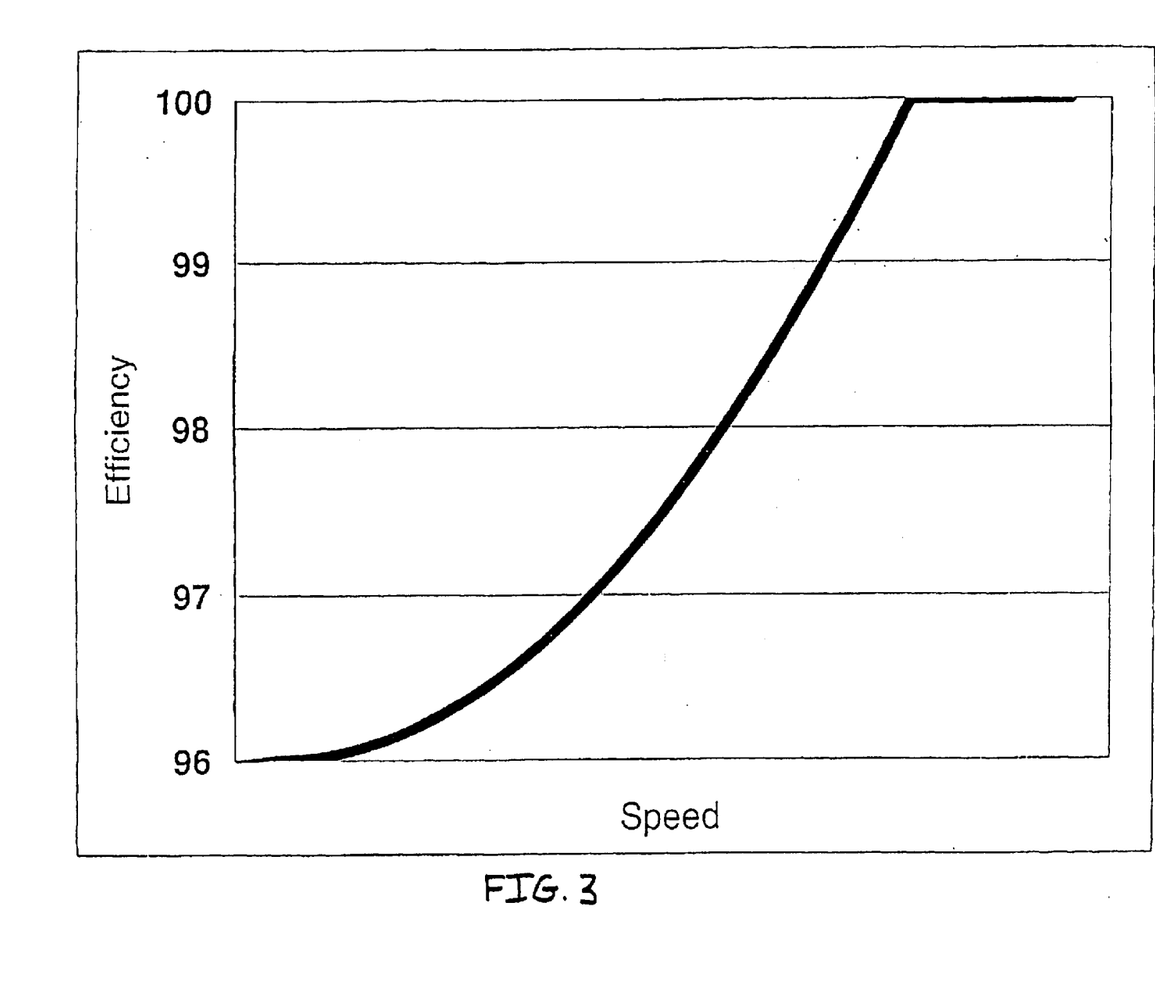
FIG. 3 is a graph depicting the overall efficiency of power transfer from the power source to the work device versus the speed of the input to the work device showing the power transfer efficiency increasing as the speed of the input to the work device increases.

Because clutch 16 is more efficient at transmitting power than coupler 10, the overall efficiency of the power transmission increases as the speed of input 15 of work device 14 increases. For example, assuming the power transmission efficiency of coupler 10 is 96% and the power transmission efficiency of clutch 16 is 100%, the efficiency of power transmission increases from 96% to 100% as the speed of input 15 of work device 14 increases as shown in FIG. 3. The resulting increase in power transmission efficiency is the result of the shift in power transmission from the less efficient coupler 10 to the more efficient clutch 16. Thus, by providing clutch 16, the overall power transmission efficiency from power source 12 to work device 14 increases as the speed of input 15 of work device 14 increases. According to alternative embodiments of the present disclosure, separate outputs from the power source are provided for the coupler and clutch and separate inputs to the work unit are provided for the coupler and the clutch.

Figure 4:
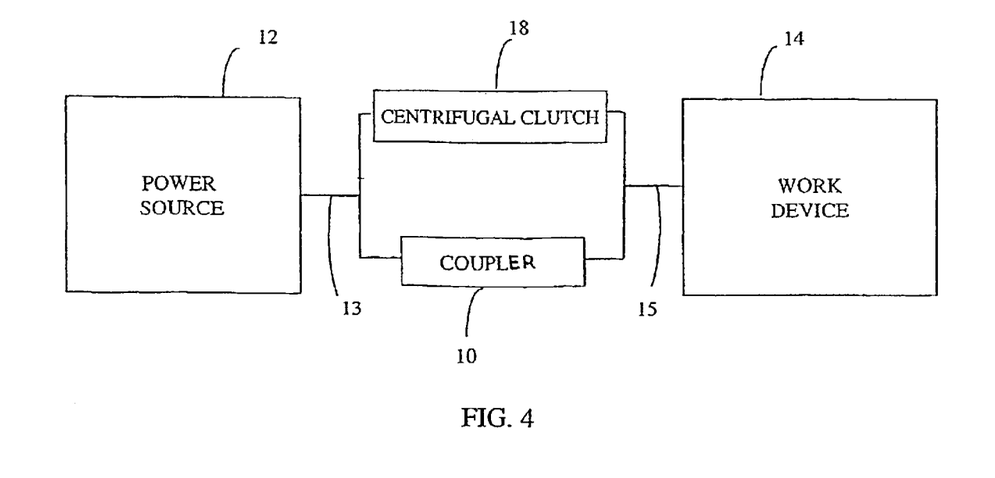
FIG. 4 is a block diagram showing the power source, the work device, the coupler, and a centrifugal clutch mechanically coupling the power source to the work device.

According to an alternative embodiment of the present disclosure, a preferred embodiment clutch is provided with coupler 10. As shown in FIG. 4, a centrifugal clutch 18 is provided that uses friction to mechanically couple input 15 of work device 14 to output 13 of power source 12 when the hydraulic coupling characteristics provided by coupler 10 are no longer necessary or desirable. Centrifugal clutch 18 provides more efficient power transmission from power source 12 to work device 14 by providing increased mechanical or frictional coupling therebetween as the speed of input 15 of work device 14 increases. Thus, when input 15 of work device 14 is at zero rpm, centrifugal clutch 18 provides little or no frictional coupling between power source 12 and work device 14.

As the speed of input 15 of work device 14 increases, the frictional coupling provided by centrifugal clutch 18 also increases so that when input 15 of work device 14 reaches a predetermined speed, centrifugal clutch 18 provides direct coupling between power source 12 and work device 14. Thus, as the speed of input 15 of work device 14 increases, the overall percentage of power transmitted from power source 12 to work device 14 through coupler 10 decreases and the overall percentage of power transmitted by centrifugal clutch 18 increases. Because centrifugal clutch 18 is more efficient at transferring power than coupler 10, the overall power transmission efficiency increases as the speed of input 15 of work device 14 increases.

Figure 5:
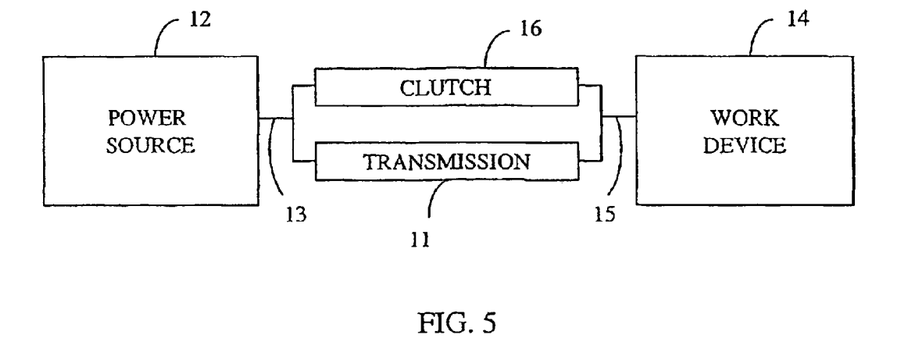
FIG. 5 is a block diagram showing the power source, the work device, the clutch, and a transmission coupling the work device to the power source.

According to the present disclosure, a preferred embodiment coupler is provided. As shown in FIG. 5, the coupling is a transmission 11 that couples power source 12 to work device 14 along with clutch 16 that mechanically or otherwise couples power source 12 to work device 14. Transmission 11 is configured to convert the speed and torque provided by power source 12 into more usable speed and torque required by work device 14 until work device 14 reaches a predetermined normal operation mode, such as the overdrive mode of a vehicle.

As work device 14 approaches this normal operation mode, clutch 16 begins to mechanically couple power source 12 to work device 14 so that less and less of the power transmitted from power source 12 to work device 14 is transferred through transmission 11. Because clutch 16 is more efficient at power transfer than transmission 11, the overall power transmission efficiency increases as the speed of input 15 of work device 14 increases.

Figure 6:
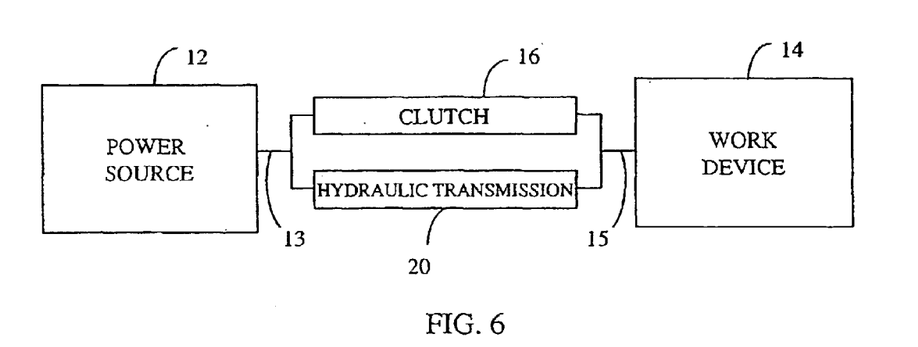
FIG. 6 is a block diagram showing the power source, the work device, the clutch, and a transmission hydraulically coupling the work device to the power source to coordinate the input requirements of the work device with the output of the power source.

According to the present disclosure, a preferred embodiment transmission is provided. As shown in FIG. 6, the transmission is a hydraulic transmission 20 that hydraulically couples power source 12 to work device 14 along with clutch 16 that mechanically or otherwise couples power source 12 to work device 14. Hydraulic transmission 20 is configured to convert the speed and torque provided by power source 12 into more usable speed and torque required by work device 14 until work device 14 reaches a predetermined normal operation mode, such as the overdrive mode of a vehicle. As work device 14 approaches this normal operation mode, clutch 16 begins to mechanically couple power source 12 to work device 14 so that less and less of the power transmitted from power source 12 to work device 14 is transferred through hydraulic transmission 20. Because clutch 16 is more efficient at power transfer than hydraulic transmission 20, the overall power transmission efficiency increases as the speed of input 15 of work device 14 increases.

According to alternative embodiments of the present disclosure, other configurations of transmissions are provided. For example, manual or automatic transmissions having gear boxes, planetary gear arrangements, clutches, belt-drive mechanisms, or other manual and automatic transmissions known to those of ordinary skill in the art are provided.

Figure 7:
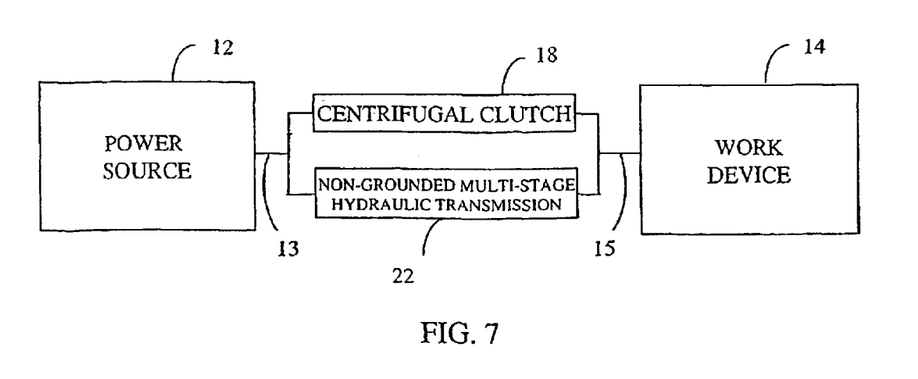
FIG. 7 is a block diagram showing the power source, the work device, a non-grounded multi-stage hydraulic transmission hydraulically coupling the work device to the power source, and the centrifugal clutch mechanically coupling the work device to the power source.

FIG. 7 is a block diagram of yet another embodiment of the present disclosure showing a preferred embodiment hydraulic transmission. A non-grounded multi-stage hydraulic transmission 22 is provided that hydraulically couples power source 12 to work device 14. Centrifugal clutch 18 is provided to mechanically couple power source 12 to work device 14 as the speed of input 15 of work device 14 increases to a predetermined speed wherein the need for the torque and speed conversion provided by non-grounded multi-stage transmission 22 become less necessary. Because of the increased power transmission efficiency of centrifugal clutch 18, the overall power transfer from power source 12 to work device 14 is increased by shifting the power transfer from non-grounded multi-stage hydraulic transmission 22 to centrifugal clutch 18 as the speed of input 15 of work device 14 increases.

Figure 8:
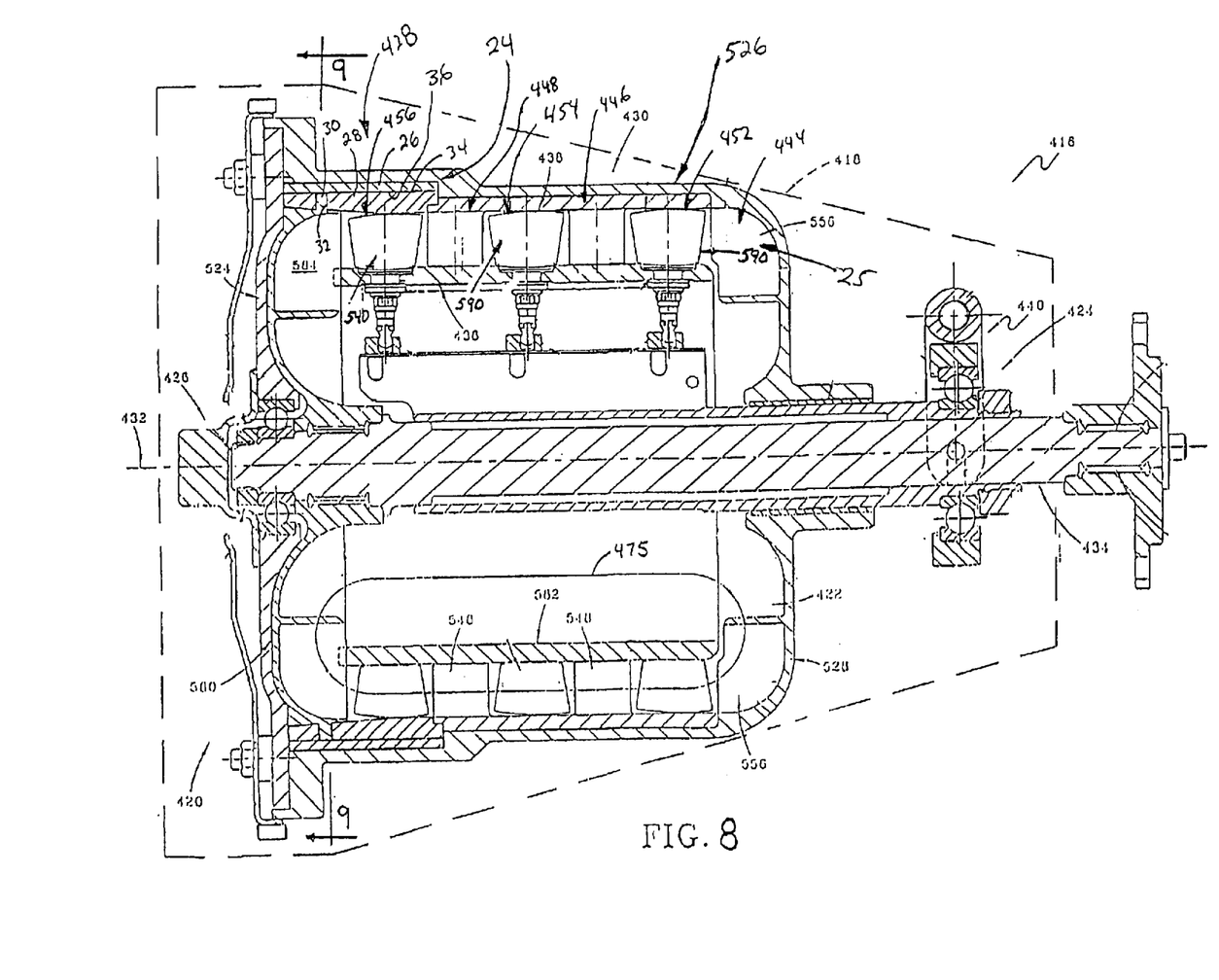
FIG. 8 is a sectional view of a preferred embodiment non-grounded multi-stage hydraulic transmission and a preferred embodiment centrifugal clutch.

FIG. 8 is a side elevation view of a preferred embodiment non-grounded multi-stage hydraulic transmission 416 and a preferred embodiment mechanical coupler, centrifugal clutch 24, positioned therein. Hydraulic transmission 416 is configured to hydraulically couple a power source to a work device to transfer power thereto. This hydraulic coupling provides a first drive path from the power source to the work device and permits the output of the power source to operate at a different speed and torque than the input of the work device as the work device is brought up to speed and, if necessary, during normal operation of the work device. Additional description of the components and functioning of hydraulic transmission 416 and other suitable hydraulic transmissions for use with centrifugal or other clutches is provided in PCT Application Serial No. PCT/US00/14054 and U.S. Provisional Patent Application Ser. No. 60/135, 340, the disclosures of which have been expressly incorporated herein by reference.

Centrifugal clutch 24 provides a second drive path between the power source and the work device that is parallel to hydraulic transmission 416 to also transfer power from the power source to the work device. However, centrifugal clutch 24 begins to transfer power to the work device 14 only after hydraulic transmission 416 generates input speed to the work device. As the speed of the input to the work device increases, centrifugal clutch 24 transfers a higher percentage of the power from the power source to the work device.

Clutch 24 is more efficient at transferring power to the work device than hydraulic transmission 416. Thus, as the percentage of power transferred by clutch 24 increases and the percentage of power transmitted by hydraulic transmission 416 decreases, the overall power transmission efficiency increases.

Transmission apparatus 416 includes an outer shell or housing 418, an input device 420 configured to receive rotational energy from a suitable power source, such as a combustion engine, a volume of fluid 422 that receives energy from input device 420, and an output device 424 configured to receive energy from fluid 422 and transmit said energy to a suitable work device, such as the drive wheels of a vehicle. Input device 420 receives energy from a power source at an rpm and torque and introduces this energy into fluid 422. Output device 424 removes this energy from fluid 422 to provide power at a useful rpm and torque to the work device.

As shown in FIG. 8, input device 420 includes an input shaft 426 configured to be coupled to a power source, an outer housing 428 coupled to input shaft 426, and a series or stages of pumps 430 coupled to outer housing 428. Input shaft 426, outer housing 428, and pumps 430 rotate about a first axis of rotation 432 relative to outer shell 418.

Torque and speed from the power source are transmitted through input shaft 426 and outer housing 428 to pumps 430. Pumps 430 then introduce this energy into fluid 422 by changing the speed and direction of fluid 422 traveling through transmission apparatus 416 to create a flow in clockwise direction 475 through transmission apparatus 416.

Output device 424 includes an output shaft 434, an inner housing 436 coupled to output shaft 434, a series or stages of turbines 438 coupled to inner housing 426, and a turbine adjustment mechanism 440 coupled to turbines 438. Turbines 438 transmit power from fluid 422 to output shaft 434 through inner housing 436. This energy is removed from fluid 422 by changing the speed and direction of fluid 422 traveling through transmission apparatus 416. Thus, power is transmitted from input device 420 to output device 424 through fluid 422 so that transmission apparatus 416 hydraulically couples the power source to the work device.

Outer housing 428 of input device 420 includes a first hub 524 coupled to input shaft 426, a cylindrical body 526 coupled to first hub 524, and a second hub 528 coupled to cylindrical body 526. Pumps 430 include a series of input blades 548 coupled to outer housing 526 and a series of input blades 556 coupled to second hub 528.

Inner housing 436 of output device 424 includes a hub 580 and a cylindrical body 582 coupled to hub 580. Turbines 438 include a series of output blades 590 coupled to cylindrical body 582 and a series of output blades 584 coupling cylindrical body 582 to hub 580 (output blades 584 are not shown in FIG. 9 for clarity).

When the power source begins operation, input shaft 426 and outer housing 428 begin to rotate so that input blades 548, 556 push fluid 422 in clockwise direction 475. This flow of fluid 422 pushes against output blades 590, 584 to cause inner housing 436 and output shaft 434 to also rotate. Thus, input blades 548, 556, fluid 422, and output blades 590, 584 define a fluid coupler 25 that hydraulically couples the power source to the work device so that power can be transferred therebetween.

As shown in FIG. 8, series of pumps 430 include first, second, and third pumps 446, 448 and series of turbines 438 includes first and second turbines 452, 454 positioned between respective pumps 444, 446, 448 and a third turbine 456 positioned adjacent to third pump 448. First, second, and third pumps 444, 446, 448 transfer energy from input shaft 426 into fluid 422 and respective first, second, and third turbines 452, 454, 456 remove this energy from fluid 422 and transfer the energy to output shaft 434.

Figure 9:
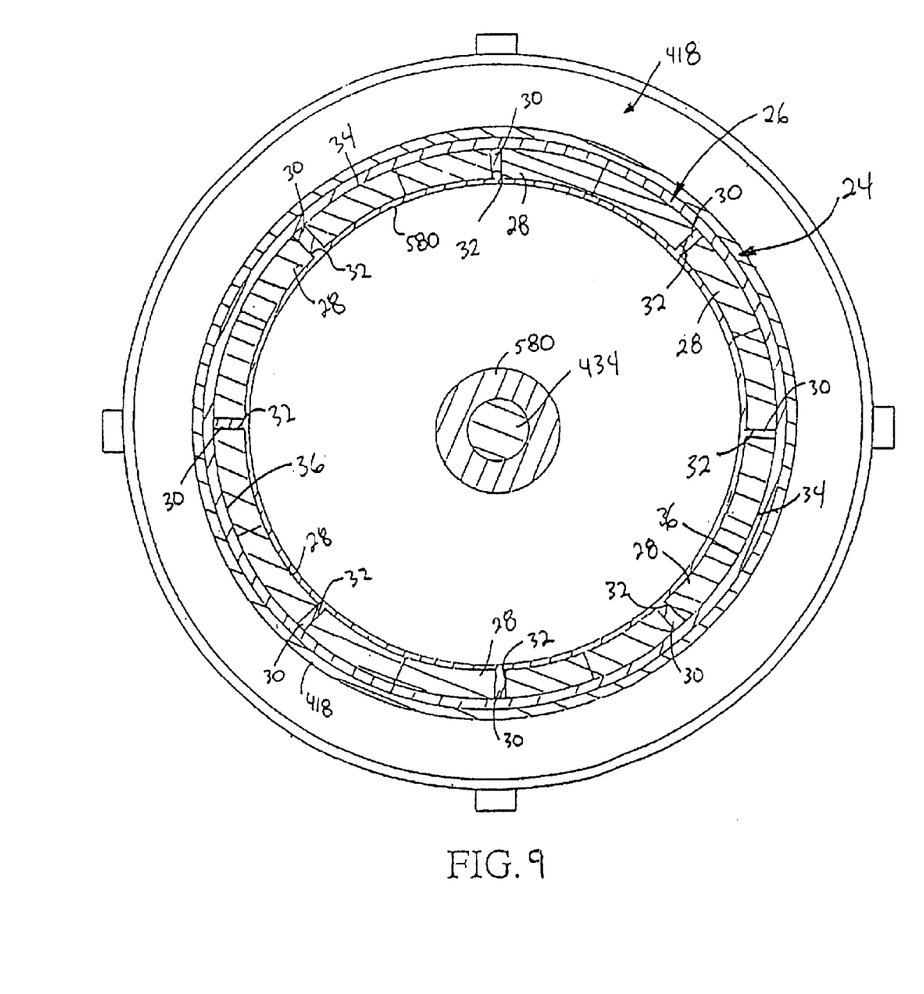
FIG. 9 is a sectional view taken along line 9-9 of FIG. 8.

As shown in FIGS. 8 and 9, centrifugal clutch 24 is positioned between input device 420 and output device 424 to provide direct mechanical coupling therebetween. Centrifugal clutch 24 includes a first friction device consisting of an outer annular sleeve or journal bearing 26 rigidly coupled to cylindrical body 526 of outer housing 428 and thus input shaft 426 and a second friction device consisting of eight arch-shaped or arcuate clutch pads 28 coupled to hub 580 of inner housing 436 and thus output shaft 434. Hub 580 includes a plurality of pins 30 and clutch pads 28 are formed to include pin-receiving apertures 32 sized to receive pins 30. Apertures 32 are slightly larger than pins 30 so that clutch pads 28 may move relative to hub 580 as they are drawn outwardly by centrifugal force as they rotate with hub 580 and the remainder of output device 424 including output shaft 434. According to alternative embodiments, fewer or more clutch pads of the same or different configurations known to those of ordinary skill in the art are provided.

Preferably, sleeve bearing 26 is made of cast iron. However, according to alternative embodiments, the sleeve bearing is made of a lead alloy, a silver-lined steel alloy, oil lite, or any other suitable material known to those of ordinary skill in the art. Clutch pads 28 are preferably made of wear-resistant materials known to those of ordinary skill in the art.

When the power source initially begins to rotate input device 420, output device 424 does not rotate. Because output device 424 is not rotating, no centrifugal force is applied to clutch pads 28. However, as input device 420 causes fluid 422 to move in direction 475, output device 424 begins to rotate. Because of this rotation, centrifugal forces are generated on clutch pads 28. These centrifugal forces cause clutch pads 28 to move radially outwardly on pins 30 so that outer surfaces 34 of clutch pads 28 contact inner surface 36 of journal bearing 26. These centrifugal forces create a normal force between clutch pads 28 and journal bearing 26 which create friction between clutch pads 28 and journal bearing 26 creating direct mechanical coupling or contact between input device 420 and output device 424.

When output device 424 is at a relatively low speed, small centrifugal forces are applied to clutch pads 28. As the speed of output device 424 increases, larger centrifugal forces are applied to clutch pads 28 and thus, the normal forces and tangential friction between clutch pads 28 and outer journal bearing 26 also increase. The friction between clutch pads 28 and journal bearing 26 increases the amount of torque transmitted from first hub 524 of input device 420 directly to hub 580 of output device 424 through journal bearing 26 and clutch pads 28. Thus, as the speed of output device 424 increases, more power is transmitted directly from input shaft 426 and first hub 524 to hub 580 and output shaft 434 without passing through input blades 548, 556, fluid 422, and output blades 590, 584.

According to the presently preferred embodiment, when output device 424 reaches a predetermined speed, such as an overdrive speed of a vehicle, enough normal and frictional force exists between clutch pads 28 and journal bearing 26 that clutch pads 28 cease slipping relative to journal bearing 26 and rotate at the same speed so that all of the power is transferred through clutch 24 (complete mechanical coupling exists between input device 420 and output device 424). According to alternative embodiments of the present disclosure, the clutch engages only at a specific predetermined speed. Thus, the clutch provides no power transfer between the power source and the work device until the predetermined speed is reached, at which point all or nearly all the power transfer is provided through the mechanical coupling provided by the clutch.

By increasing the mechanical coupling between the power source and the work device, centrifugal clutch 24 increases the overall power transmission efficiency from the power source to the work device. Because clutch 24 is more efficient at transmitting power than fluid coupler 25, the overall power transmission efficiency increases as the percentage of power transmitted through clutch 24 increases. Thus, centrifugal clutch 24 provides a passive mechanical coupler that increases the degree of mechanical coupling between input shaft 426 and output shaft 434 as the speed of output shaft 434 increases. As a result, the overall power transmission efficiency from the power source to the work device also increases.

The shifting of power transmission from fluid coupler 25 to centrifugal clutch 24 occurs gradually over a range of output shaft speeds. Preferably, when output shaft 434 is not rotating, all of the energy provided by the power source is transferred to the work unit by fluid coupler 25. When output shaft 434 initially begins to rotate, a small percentage of the power transmission occurs through centrifugal clutch 24 and the remainder of the power transmission occurs through fluid coupling 25. As output shaft 434 rotates faster, the percentage of power transmitted by centrifugal clutch 24 increases as the percentage of power transmitted by fluid coupling 25 decreases until the work device reaches it cruise or normal operating speed at which point centrifugal clutch 24 transmits all the power from the power source to the work unit.

Figure 10:
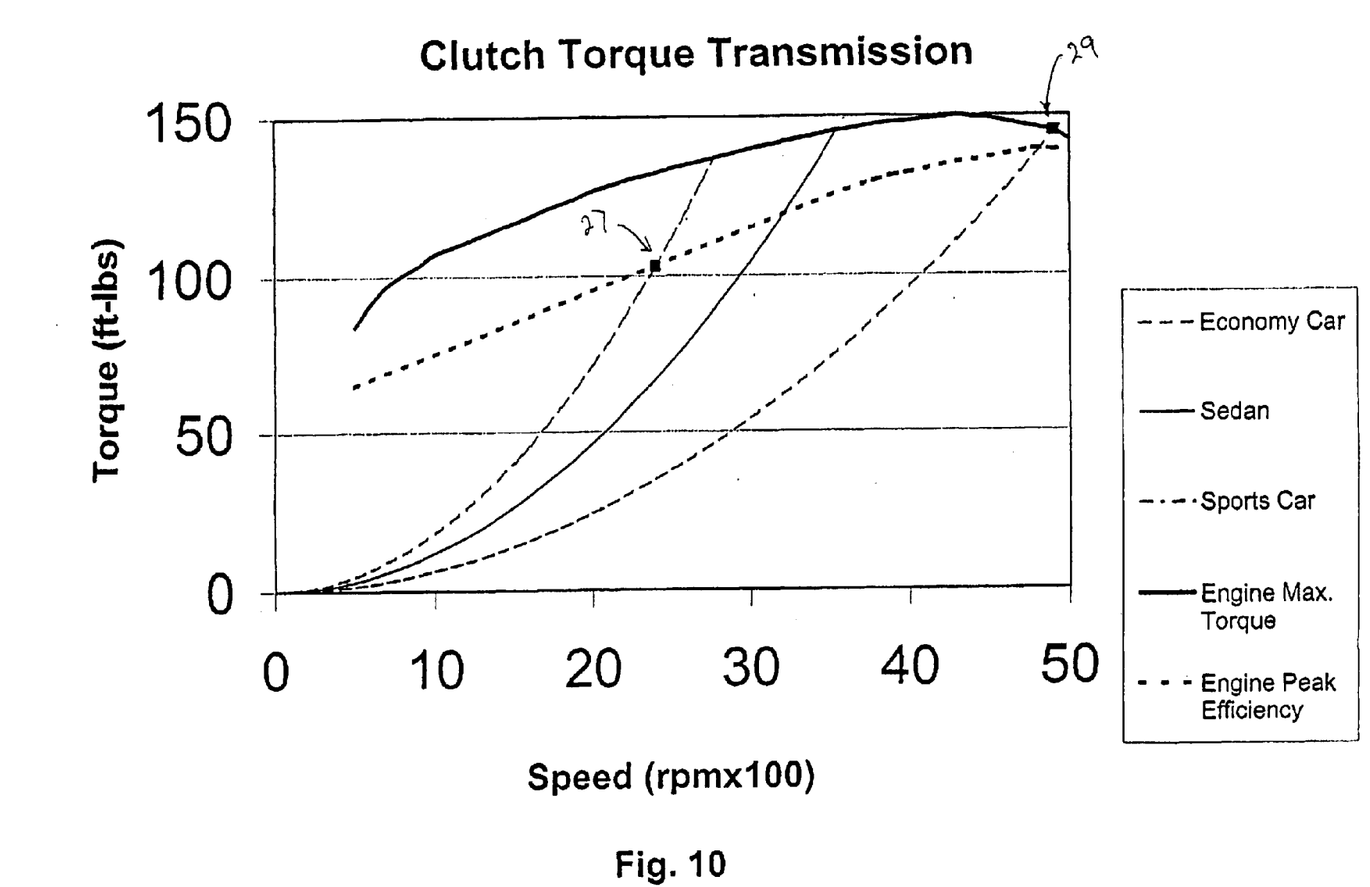
FIG. 10 is graph depicting the torque transmission by three centrifugal clutch arrangements.

Transmission 416 is suitable for use with a standard gasoline automobile engine. In such an application, an illustrative automobile engine has an idle speed of approximately 500 rpm, a cruise speed of approximately 2500 rpm, and a maximum or "red line" speed of approximately 5000 rpm as shown in FIG. 10. Preferably, the vehicle is moving at 65 mph (105 kilometers/hour) during cruising and the vehicle tires are rotating at 792 rpm (assuming a vehicle tire size of approximately 24 inches (61 cm)). Such a vehicle has an exemplary top speed of 130 mph (208 kilometers/hour). Typically, a differential or other speed reducing/torque increasing device is provided between transmission apparatus 416 and the vehicle tires to reduce the rotational speed provided by transmission 416 to the vehicle's tires.

This illustrative vehicle illustration is exemplary. Transmission apparatus 416 may also be used with engines of other sizes, outputs, and operating speeds and other power sources such as diesel engines, gas turbines, and other power sources known to those of ordinary skill in the art.

When at the idle speed, centrifugal clutch 24 transmits little or no power because the vehicle's wheels and thus output shaft 434 are not rotating as shown for three configurations (economy car, sedan, and sports car) for centrifugal clutch 24 at zero rpm. When the vehicle's brakes are released and the vehicle's wheels are permitted to rotate, centrifugal clutch 24 begins to transmit power from the vehicles engine to the wheels because output shaft 434 is also rotating.

As output shaft 434 rotates faster, a higher percentage of the vehicles power output and more torque is transmitted through centrifugal clutch 24. Clutch pads 28 for the economy car configuration are sized and weighed so that when the vehicle reaches "cruising speed" all of the power from the vehicle's engine is transmitted through centrifugal clutch and no power is transmitted through fluid coupler 25. Thus, when the vehicle reaches cruising speed and the vehicle's engine is preferably operating at 2500 rpm and the tires are rotating at 792 rpm, centrifugal clutch 24 is transmitting all of the power from the engine to the wheels.

Thus, according to the presented example, centrifugal clutch 24 gradually increases it's power transfer from zero percent when the vehicle tires are not rotating to 100 percent with the vehicle is at the cruise speed of 65 mph (792 rpm for the tires). Thus, centrifugal clutch 24 transfers all the vehicle engine's power when the vehicle is at approximately one-half of its top speed and the shift occurs over the vehicle's entire acceleration range (i.e. the range of speeds between the vehicle being stopped and the operating at cruise speed).

According to alternative embodiments of the present disclosure, other gradual shift patterns between centrifugal clutch 24 and fluid coupler 25 are provided. For example, according to some alternative embodiments, the gradual shifting occurs over only a portion of the vehicle's or work device's acceleration range. For example, according to one embodiment, the shifting occurs over one half of the work devices acceleration range. According to another embodiment, the gradual shifting occurs over one quarter of the work device's acceleration range. According to another embodiment, the gradual shifting occurs of one tenth of the work device's acceleration range. According to another embodiment, the gradual shifting occurs over one twentieth of the work device's acceleration range. According to another alternative embodiment, the gradual shifting occurs over one hundredth of the work device's acceleration range. According to other alternative embodiments of the present disclosure, other gradual shifting ranges between the illustrated ranges are provided. These alternatives rely on weighting the clutch pads to provide enough friction torque at the predetermined speed to transfer all the energy between the input and output shafts. According to other alternatives, springs or other means known to those of ordinary skill in the art for creating torque as provided.

According to alternative embodiments of the present disclosure, the centrifugal clutch is configured to instantaneously shift the power transfer from the fluid coupler to the centrifugal clutch when the output shaft reaches a predetermined speed. For example, according to one embodiment, the shift suddenly occurs at a predetermined output shaft speed before or at the cruise speed.

According to other alternative embodiments of the present disclosure, the beginning of shifting between fluid coupler 25 and centrifugal clutch 24 is delayed until the work device reaches a predetermined speed. For example, according to one alternative embodiment, the shifting does begin until the work device has reached one eighth of its cruise speed. According to another alternative embodiment, the shifting does not begin until the work device has reached one quarter of its cruise speed. According to other alternative embodiments the shifting does not begin until the work device reaches either one half, three quarters, seven eighths, or 99 percent of its cruise speed. According to other alternative embodiments, the shifting does not begin until other predetermined speeds between the exemplary predetermined speeds mentioned above. To delay the shifting, springs or other devices known to those of ordinary skill in the art are provided to delay engagement of the clutch pads with the journal bearing. According to yet another embodiment of the present disclosure, the clutch pads are biased into contact with the journal bearing so that a predetermined percentage of power is transmitted before the output shaft begins to rotate.

If the operator of the power source, such as the driver of a vehicle, increases the torque output of the power source, centrifugal clutch 24 will begin to slip if the increase in torque is enough to overcome the frictional torque between clutch pads 28 and journal bearing 26. Such an increase in torque may occur when the vehicle driver presses on the accelerator during passing of another vehicle. Typically, the speed of input shaft 426 also increases. This increase in speed causes input blades 548, 556 to input energy into fluid 422. Output blades 590, 584 receive this energy and cause output shaft 434 to also increase in speed. The increased speed of output shaft 434 cause clutch pads 28 to increase in speed creating additional frictional torque between clutch pads 28 and journal bearing 26. As the speed of output shaft 434 and clutch pads 28 increases, the additional frictional torque compensate for the increase torque from the power source so that clutch pads 28 and journal bearing 26 no longer slip.

During slow down of the power source or work device, centrifugal clutch 24 begins to decrease the mechanical coupling between the power source and the work device. As the input speed to the work device decreases because of the slow down, the speed of hub 580 and the remainder of output device 424 decreases and the centrifugal forces on clutch pads 28 also decrease. Eventually, the centrifugal force on clutch pads 28 decreases enough so that clutch pads 28 begin to slip relative to sleeve bearing 26 and power transfer again occurs through fluid coupler 25. As the speed of output device 424 continues to decrease, the percentage of power transmitted through clutch 24 also decreases until little or no power is transmitted therethrough when output shaft 434 stops rotating.

Clutch pads 28 are configured for the particular performance characteristics desired for the work device. For example, clutch pads 28 are configured differently for an economy car, a sedan, and a sports car. In each of these configurations, the efficiency of energy transfer is balanced against acceleration capacities. For example, as illustrated in FIG. 10, clutch pads 28 for an economy car a configured to transfer more torque at lower speeds than a sedan and a sports car. Similarly, clutch pads 28 are configured to transfer more torque at lower speed for the sedan configuration than for the sports car configuration.

By increasing the torque transferred by centrifugal clutch 24 at the lower speeds for the economy car, the benefits of increased transfer efficiency are provided at lower speeds. Thus, the highest transfer efficiency is available over a wider range of speeds. As shown in FIG. 10, the maximum efficiency of the vehicle's engine is at point 27. Thus, when the vehicle's engine operating at peak efficiency, centrifugal clutch is transferring all the engine's power. According to alternative embodiments of the present disclosure, the centrifugal clutch is configured to lock up the fluid coupler before reaching the engine's or other power sources' peak efficiency.

By reducing the torque transferred by centrifugal clutch 24 at the lower speeds and delaying the "lock up" torque for the sports car, slip between the power source and work device is available over a wider range of speeds. Thus, if the operator of the sports car pushes on the accelerator in an effort to quickly accelerate the car, the engine will not bog down during ramp up of the engine speed because centrifugal clutch 24 permits slip between the vehicle engine and the vehicle's tires. Thus, the vehicle's engine can quickly ramp up to it's peak horsepower at point 29 when centrifugal clutch 24 locks up fluid coupler 25. Thus, the vehicle's engine is able to quickly ramp up to the maximum horsepower without being bogged down by the mass of the vehicle and maximizes the transfer of power through transmission 416 at the peak engine horsepower. According to alternative embodiments of the present disclosure, the centrifugal clutch locks up before or after the peak horsepower of the vehicle engine or other power source.

The configuration of centrifugal clutch 26 for the sedan is between the sports car configuration and the economy car configurations car configuration. Thus, the sedan configuration is more efficient, but less "powerful," than the sports car configuration and more powerful, but less efficient, than the economy car configuration.

Preferably, clutch pads 28 are heavier for the economy car configuration than for the sedan or sports car configuration and heavier for the sedan configuration than for the sports car configuration. The additional weight creates additional centrifugal force and thus more frictional torque. According to alternative embodiments of the present disclosure, other devices and mechanisms are provided to control the torque transmission by the clutch. For example, according to one embodiment, springs are provided to bias the clutch pads.

According to alternative embodiments of the present disclosure, active clutches are provided that increase the degree of mechanical coupling between the input device and the output device of the transmission apparatus. An active clutch may include a sensor (not shown) and controller (not shown) that detects the input speed to the work device and creates more efficient mechanical, hydraulic, pneumatic, magnetic, or other coupling between the power source and the work device based on the input speed to the work device. According to the present disclosure, the sensors and controllers are mechanical, electrical, or another other type of sensors and controllers known to those of ordinary skill in the art. According to one embodiment, the controllers are configured to be responsive to the operator's use of the accelerator, brakes, and/or speed of the work device. For example, according to one alternative embodiment of the present disclosure, if the accelerator is quickly depressed by a vehicle operator attempting to quickly accelerate the vehicle, the clutch is configured to permit sufficient slip to occur through the fluid coupler to permit the vehicle to quickly reach the desired horsepower and then the clutch gradually or otherwise locks up the fluid coupler.

According to another embodiment, a controller is provided that is configured to change the clutch's mode of operation. For example, according to one embodiment, the controller is configured to switch the clutch between the economy, sedan, and sports car configurations described in relation to FIG. 10. Thus, an operator may select the mode of operation of the clutch to obtain more efficiency, more power, or a combination of the two performance aspects.

According to alternative embodiments of the present disclosure, the clutches (passive or active) are axial clutches having input and output clutch plates that engage during ramp up of the speed of the input of the work device, gears, belts, or other mechanical, hydraulic, pneumatic, magnetic, or other devices that provide more efficient power transmission.

Although the invention has been described in detail with reference to certain illustrated embodiments, variations and modifications exit within the scope and spirit of the present invention as described and defined in the following claims.

What is claimed is:

1. A transmission apparatus configured to transmit energy from a power source to a work device, the transmission apparatus comprising an outer housing defining an interior region containing a fluid, an input shaft configured to rotate about a first axis of rotation and adapted to be coupled to the power source to receive energy therefrom, an output shaft configured to rotate about a second axis of rotation and adapted to be coupled to the work device to transmit energy thereto, a first pump positioned in the interior region of the outer housing, the first pump being coupled to rotate with the input shaft to input a first portion of the energy from the power source into the fluid contained in the interior region of the outer housing, a first turbine positioned in the interior region of the outer housing, the first turbine being positioned to receive energy from the fluid contained in the interior region of the outer housing and to transmit said received energy to the output shaft, a second pump positioned in the interior region of the outer housing in a position spaced apart from the first pump, the second pump being coupled to rotate with the input shaft to input a second portion of the energy from the power source into the fluid contained in the interior region of the outer housing, the first turbine being positioned between the first and second pumps, a second turbine positioned in the interior region of the outer housing in a position spaced apart from the first turbine, the second turbine being positioned to receive energy from the fluid contained in the interior region of the outer housing and to transmit said received energy to the output shaft, the second pump being positioned between the first and second turbines, and a centrifugal clutch configured to transfer energy from the input shaft to the output shaft.

2. The transmission apparatus of claim 1, wherein the centrifugal clutch includes a first friction device coupled to the input shaft and a second friction device coupled to the output shaft, the first and second friction move relative to each other to create friction therebetween that transfers energy from the input shaft to the output shaft.

3. The transmission apparatus of claim 2, wherein the first friction device includes a sleeve and the second friction device includes a plurality of clutch pads configured to slide on the sleeve.

4. The transmission apparatus of claim 3, wherein the sleeve is annular and the clutch pads are arcuate.

5. The transmission apparatus of claim 2, wherein the second friction device moves radially relative to the output shaft as the speed of the output shaft increases.

6. The transmission apparatus of claim 2, wherein the first and second friction devices have a first amount of normal forces therebetween when the output shaft is rotating at a first speed and the first and second friction devices have a second amount normal forces therebetween that is greater than the first amount when the output shaft is rotating a second speed that is greater than the second speed.

7. A transmission apparatus configured to transmit energy from a power source to a work device, the transmission apparatus comprising an input shaft adapted to receive energy from the power source, an output shaft adapted to transmit energy to the work device, a first stage of pump blades configured to transfer energy from the input shaft into a fluid, a second stage of pump blades spaced apart from the first stage of pump blades and configured to transfer energy from the input shaft into the fluid, a stage of turbine blades configured to transfer energy from the fluid to the output shaft, the first and second stages of pump blades cooperating to create a flow path of fluid from which the stage of turbine blades transfers energy, and a coupler configured to directly couple the input shaft to the output shaft to transfer energy from the input shaft to the output shaft.

8. The transmission apparatus of claim 7, wherein the coupler is a centrifugal clutch configured to directly couple the input shaft to the output shaft.

9. The transmission apparatus of claim 8, wherein the centrifugal clutch includes a plurality of clutch pads and a sleeve, the plurality of clutch pads are configured to slide on the sleeve and create friction been the clutch pad and the sleeve to transfer energy therebetween from the input shaft to the output shaft.

10. The transmission apparatus of claim 9, wherein the clutch pads are coupled to the output shaft and the sleeve is coupled to the input shaft.

11. The transmission apparatus of claim 7, wherein the percentage of energy transferred by the coupler increases as the speed of the output shaft increases and the percentage of energy transferred by the first and second pumps and the turbine decreases as the speed of the output shaft increases.

12. The transmission apparatus of claim 11, wherein the coupler transfers substantially all of the energy from the input shaft to the output shaft when the output shaft reaches a predetermined speed and the first and second pumps and the turbine transfer substantially none of the energy from the input shaft to the output shaft when the output shaft reaches the predetermined speed.

13. The transmission apparatus of claim 7, wherein the speed of the output shaft ranges from zero to at least a predetermined speed, the percentage of energy transferred by the coupling increases as the speed of the output shaft increase from zero to the predetermined speed and the percentage of energy transferred through the fluid decreases as the speed of the output shaft increases from zero to the predetermined speed.

14. The transmission apparatus of claim 13, wherein the coupling transfers no energy when the speed of the output shaft is zero and no energy is transferred through the fluid when the output shaft is rotating at the predetermined speed.

15. The transmission apparatus of claim 7, wherein the turbine blades are adjustable.

16. The transmission apparatus of claim 7, wherein the pump blades are adjustable.

17. A transmission apparatus configured to transfer energy from a power source to a work device, the transmission apparatus comprising an input shaft adapted to receive energy from the power source, an output shaft adapted to transmit energy to the work device, a fluid coupler configured to transfer energy from the input shaft to the output shaft, the fluid coupler including a plurality of blades and an adjustment mechanism configured to permit adjustment of the pitch of at least a portion of the plurality of blades, and a mechanical coupler configured to transfer energy from the input shaft to the output shaft simultaneous with the transfer of energy from the input shaft to the output shaft by the fluid coupler, the percentage of power transferred by the fluid coupler gradually decreasing and the percentage of power transferred by the mechanical coupler gradually increasing as the speed of the output shaft increases.

18. The transmission apparatus of claim 17, wherein the plurality of blades includes a plurality of input blades that transfer energy from the input shaft into a fluid and a plurality of output blades that transfer energy from the fluid to the output shaft.

19. The transmission apparatus of claim 17, wherein the plurality of blades includes first and second stages of input blades configured to transfer energy into a fluid and a first stage of output blades configured to transfer energy from the fluid to the output shaft and positioned between the first and second stages of input blades.

20. The transmission apparatus of claim 19, wherein the plurality of blades further includes a second stage of output blades and the second stage of input blades is positioned between the first and second stages of output blades.

21. The transmission apparatus of claim 17, wherein the mechanical coupler is a centrifugal clutch.

22. A transmission apparatus configured to transmit energy from a power source to a work device, the transmission apparatus comprising an input shaft adapted to receive energy from the power source, an output shaft adapted to transmit energy to the work device, a plurality of input blades configured to transfer energy from the input shaft to a fluid, a plurality of output blades configured to transfer energy from the fluid to the output shaft, the plurality of input and output blades being arranged to define at least three stages of input and output blades, and means for regulating the relative speed between the input and output blades to decrease to relative speed therebetween as the speed of the output shaft increases.

23. The transmission apparatus of claim 22, wherein the regulating means includes a centrifugal clutch configured to increase mechanical coupling between the input and output shafts as the speed of the output shaft increases.

24. The transmission apparatus of claim 23, wherein the mechanical coupling is frictional.

25. The transmission apparatus of claim 22, wherein the regulating means includes a first friction device coupled to the input shaft and a second frictional device coupled to the output shaft and the first and second friction devices cooperate to increase frictional coupling between the input and output shafts as the speed of the output shaft increases.

26. A transmission apparatus configured to transfers energy from a power source to a work device having an idle speed and a normal operating speed, the transmission apparatus comprising an input shaft configured to receive energy from the power source, an output shaft configured to rotate at an first speed when the work device operates at the idle speed and a second speed when the work device operates at the normal operating speed, the output shaft being configured to have an acceleration range of speeds between the first and second speeds, a plurality of input blades configured to transfer energy from the input shaft into a fluid, a plurality of output blades configured to transfer energy from the fluid to the output shaft, and a coupler configured to couple the input shaft to the output shaft to transfer energy from the input shaft to the output shaft, the coupler being configured to gradually increase the percentage of energy transferred thereby and to decrease the percentage of energy transferred through the fluid by the input and output blades, the coupler being configured to permit the gradual increase at initial rotation of the output shaft.

27. The transmission apparatus of claim 26, wherein the gradual increase occurs over at least two percent of the acceleration range of speeds of the output shaft.

28. The transmission apparatus of claim 27, wherein the gradual increase occurs over at least five percent of the acceleration range of speeds of the output shaft.

29. The transmission apparatus of claim 28, wherein the gradual increase occurs over at least fifty percent of the acceleration range of speeds of the output shaft.

30. The transmission apparatus of claim 29, wherein the gradual increase occurs over the entire acceleration range of speeds of the output shaft.

* * * * *